Dec. 31, 1963  R. G. H. BAUMANN  3,116,087
DRIVE ARRANGEMENT FOR FOLDABLE TOPS
OF MOTOR VEHICLES OR THE LIKE
Filed July 31, 1956  6 Sheets—Sheet 1
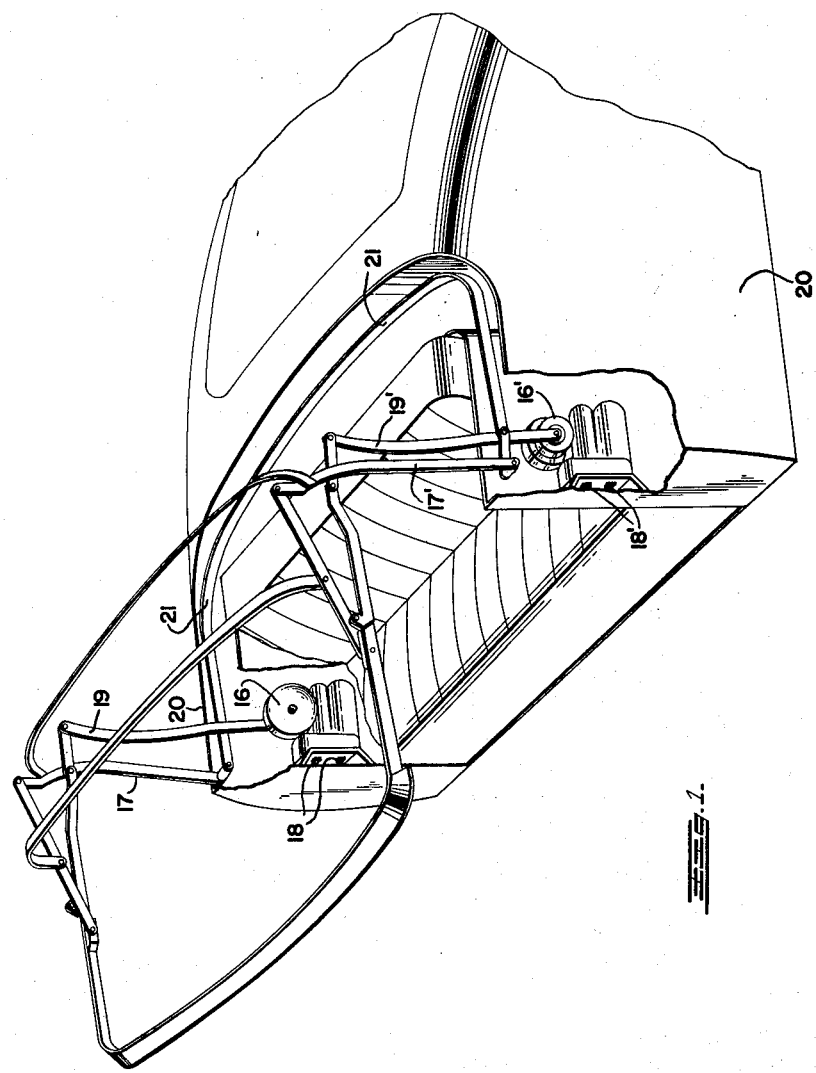
INVENTOR
RUDOLF G. H. BAUMANN
BY *Dike and Craig*
ATTORNEYS

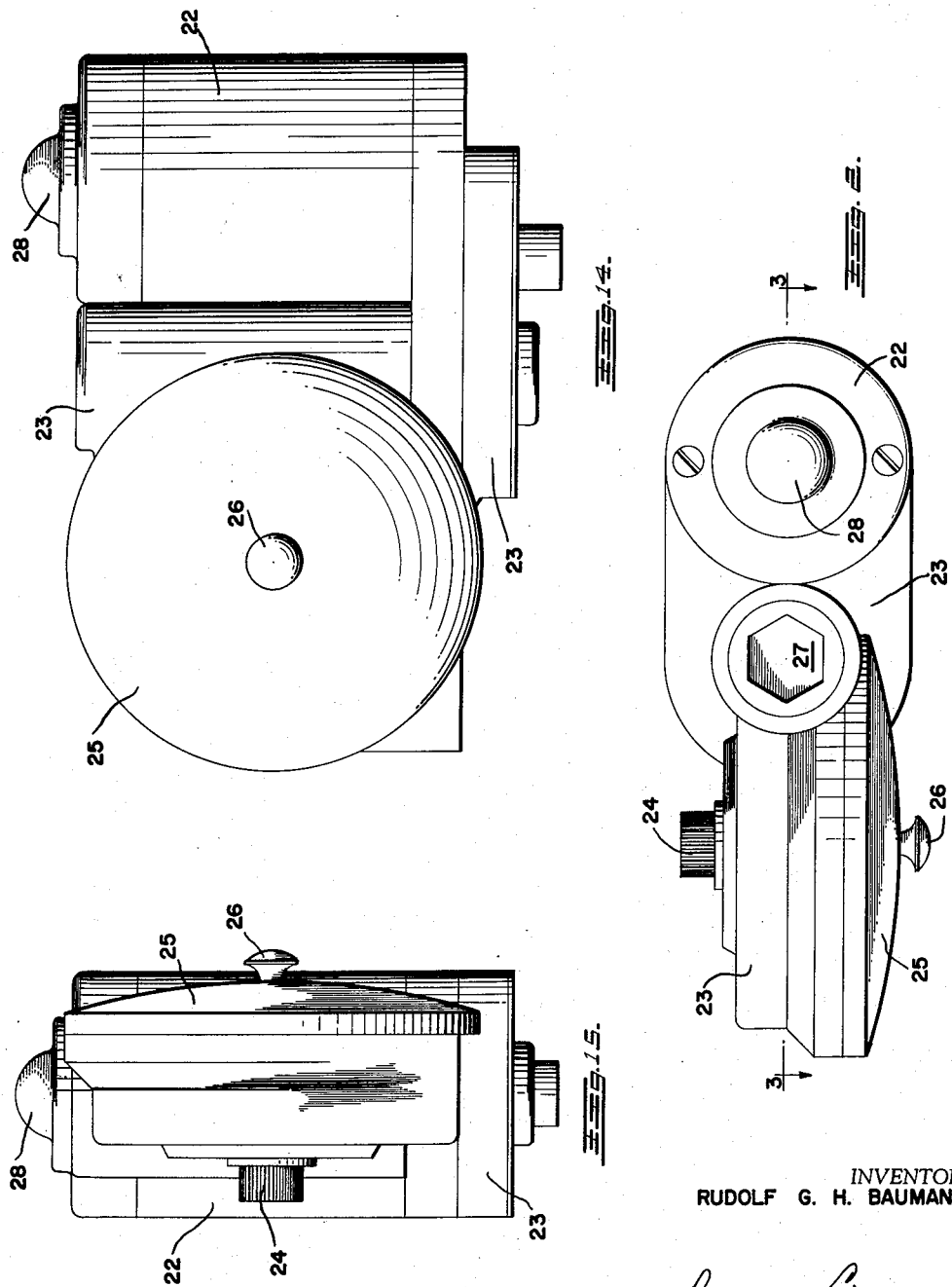

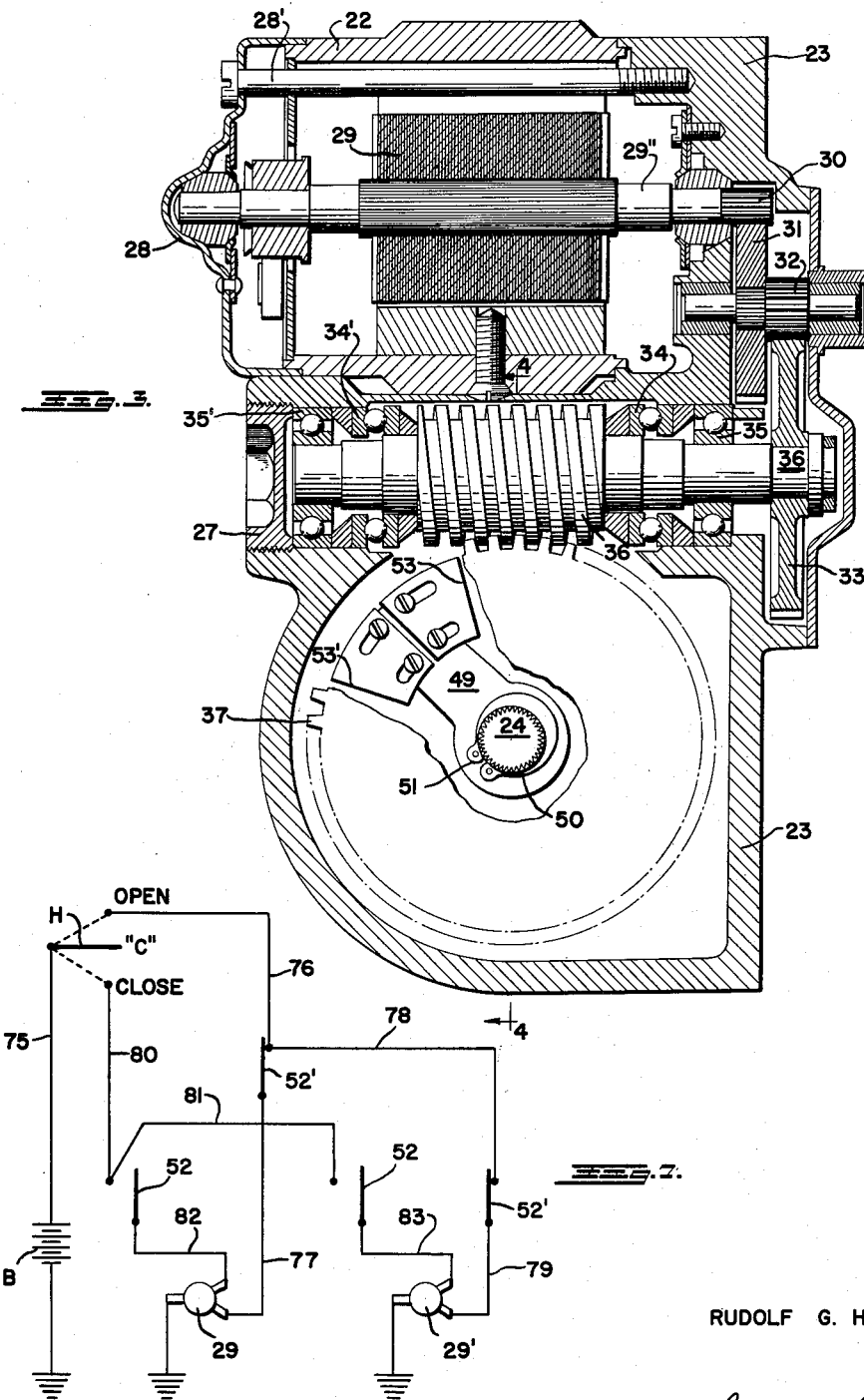

Dec. 31, 1963
R. G. H. BAUMANN
3,116,087
DRIVE ARRANGEMENT FOR FOLDABLE TOPS
OF MOTOR VEHICLES OR THE LIKE
Filed July 31, 1956
6 Sheets-Sheet 4
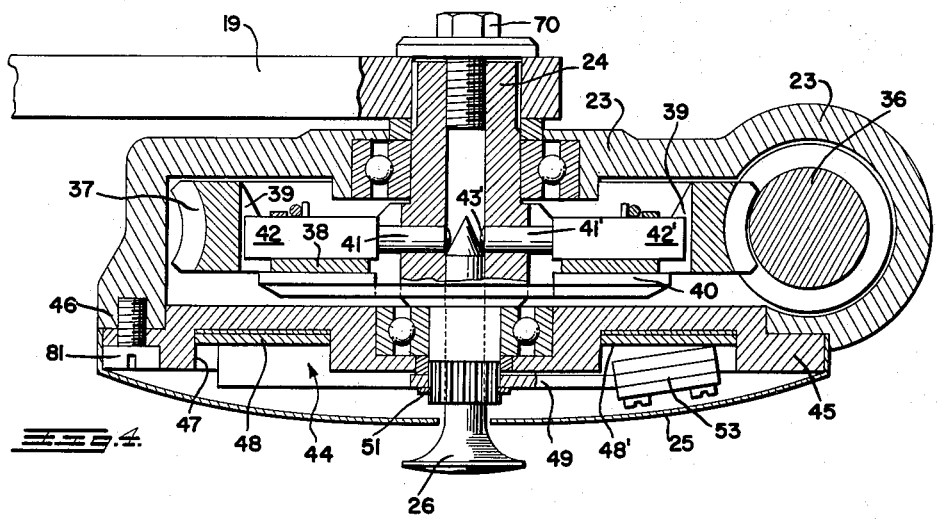
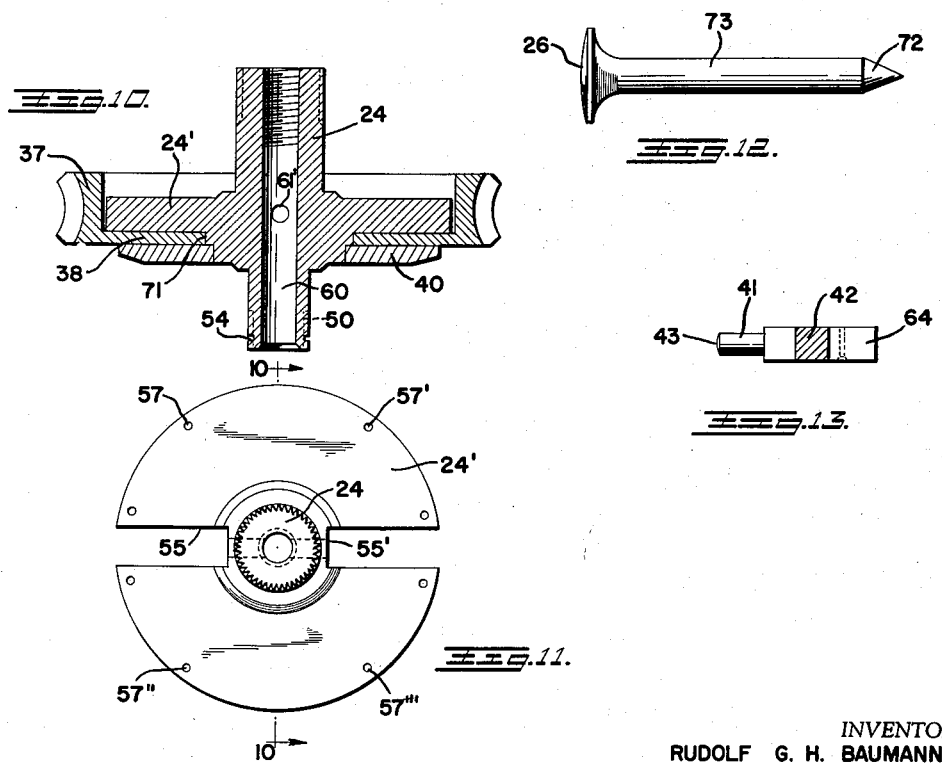
INVENTOR
RUDOLF G. H. BAUMANN
BY
ATTORNEYS

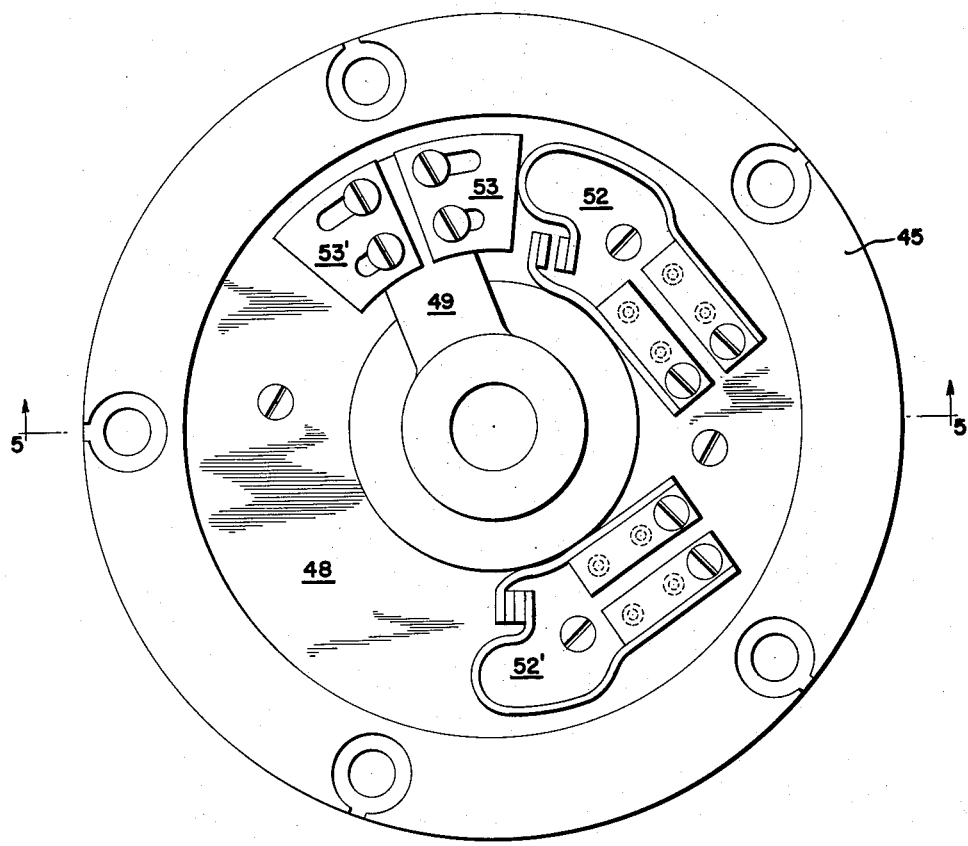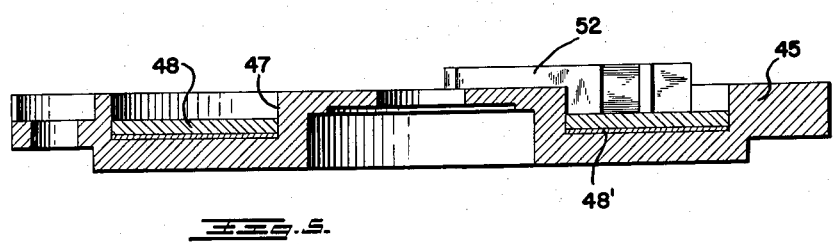

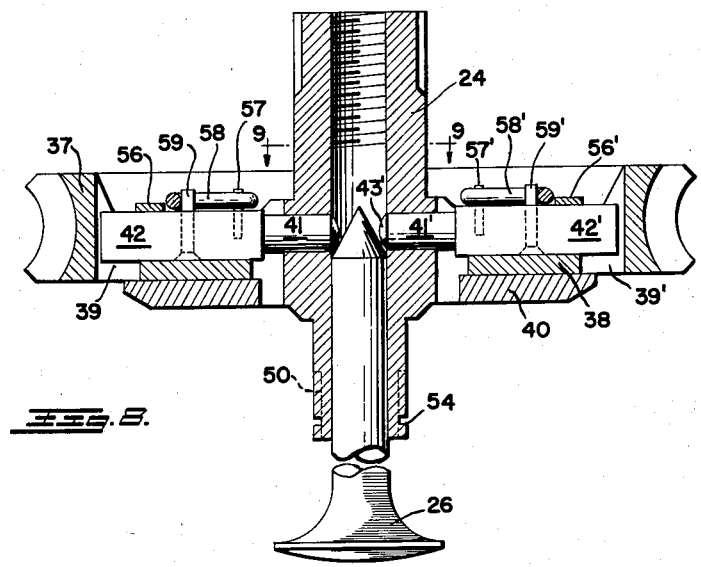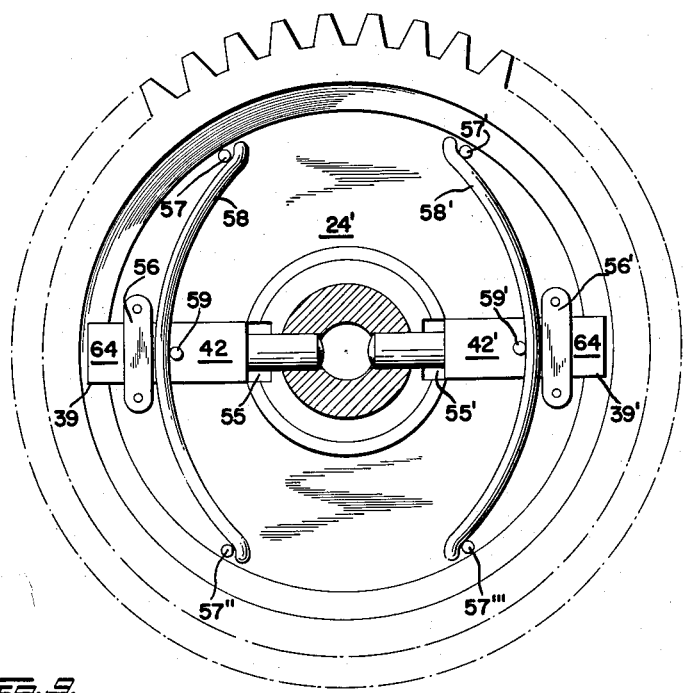

United States Patent Office 3,116,087
Patented Dec. 31, 1963

3,116,087
DRIVE ARRANGEMENT FOR FOLDABLE TOPS OF MOTOR VEHICLES OR THE LIKE
Rudolf G. H. Baumann, Sindelfingen, Kreis Boeblingen, Germany, assignor to Daimler-Benz Aktiengesellschaft, Stuttgart-Unterturkheim, Germany
Filed July 31, 1956, Ser. No. 601,201
Claims priority, application Germany Aug. 2, 1955
7 Claims. (Cl. 296—117)

The present invention relates to a drive arrangement for foldable tops of convertible motor vehicles, marquees, awnings, and similar constructions supported by pivotal struts.

Drive arrangements for foldable tops or roofs of motor vehicles are known in which the drive motor itself, such as an electric motor, together with a reduction gearing are arranged within the top or roof frame at a joint thereof so that the driving member of the motor forms directly the pivot pin. In such a construction, the driving motor is arranged at the place of the joint of the roof frame of the top. Consequently, the driving motor has to be moved during opening and closing of the top as a unit therewith. Such an arrangement is particularly unfavorable and disadvantageous insofar as the electric lines or circuits are concerned as well as the accommodation thereof which will be free of breakdowns in operation. Further difficulties are encountered with the installation of the drive mechanism into the roof frame because of the spatial requirements thereof as the drive arrangement should not impede the movement of the frame parts of the top during opening and closing thereof and also is to enable the lowering of the top into an opening of the vehicle body. Moreover, the weight of the driving motor which as arranged in the movable rod or link system of the top proves disadvantageous during opening and closing of the top.

In contradistinction thereto, the present invention contemplates an arrangement in which the entire drive unit is secured to the wall which itself supports the top, for example, to the wall of the vehicle body with simple means in such a manner that the drive units form the pivotal bearing of the roof or top part otherwise pivotally secured directly to this wall, such as the main strut or the main guide arm of the top.

In connection therewith, the driving motor which is combined according to the present invention with the reduction gearing thereof into a single housing is appropriately connected with the pivot pin of the top driven thereby by means of a disengageable clutch. The housing which is securely fastened to the vehicle wall carrying the same by means of relatively few connecting bolts, then forms simultaneously the pivot bearing for the driven roof or top part. Appropriately, the last reduction gearing stage of the transmission is formed as a worm drive which is self-locking. A clutch is arranged between the worm gear and the shaft thereof which establishes the connection between these two parts, preferably by means of entraining members which are manualy disengageable. In connection therewith, the clutch is preferably provided with a self-locking mechanism which prevents disengagement of the entraining member or clutching bolts and therewith an accidental falling of the top under the effect of its own weight as long as the drive arrangement is loaded or weighted down by the weight of the top.

Accordingly, it is an object of the present invention to provide a drive arrangement for a foldable top, for example, for motor vehicles which offers an improved spatial arrangement without the danger of impeding the operation of the frame parts of the top by the drive mechanism therefor during opening or closing thereof.

Another object of the present invention is the elimination of the detrimental effect ordinarily produced by the weight of the drive mechanism when the same is directly connected to the frame or rod system of the top or roof.

Another object of the present invention is to provide a drive mechanism for a foldable top which itself forms the pivotal bearing for the main strut of the roof and which is secured in a simple manner to readily accessible parts of the motor vehicle body.

Still another object of the present invention is the provision of such a drive mechanism which, by means of a disengageable clutch, enables operation thereof at the will of the driver and which, notwithstanding disengagement of the clutch, offers certain safety features which prevent accidental falling of the roof under its own weight.

Another object of the present invention is the provision of a drive arrangement for foldable tops which is reliable in operation and easy to install.

A further object of the present invention is the provision of such a drive mechanism for foldable tops which is compact so as to facilitate installation and which provides for an appropriate arrangement of the various control circuits and parts connected therewith.

These and other objects and features of the present invention will become more obvious from the following description when taken in connection with the accompanying drawing which shows, for purposes of illustration only, one preferred embodiment in accordance with the present invention and wherein:

FIGURE 1 is a perspective view of a rear portion of a motor vehicle with a raised top or roof frame and a built-in drive arrangement in accordance with the present invention, the top being omitted therein for clarity's sake.

FIGURE 2 is a plan view of the housing for the drive arrangement in accordance with the present invention.

FIGURE 3 is an enlarged cross-sectional view taken along line 3—3 of FIGURE 2.

FIGURE 4 is a cross-sectional view taken along line 4—4 of FIGURE 3.

FIGURE 5 is a cross-sectional view of the control disc taken along line 5—5 of FIGURE 6, with certain parts, such as the switching finger, omitted therefrom for the sake of clarity.

FIGURE 6 is a front view of the control arrangement in accordance with the present invention.

FIGURE 7 is a schematic wiring diagram for the electrical circuits of the drive arrangement in accordance with the present invention.

FIGURE 8 is a cross-sectional view through the worm gear and the clutch parts attached thereto similar to FIGURE 4.

FIGURE 9 is a cross-sectional view taken along line 9—9 of FIGURE 8.

FIGURE 10 is a cross-sectional view through the worm gear and the drive shaft similar to FIGURE 4 but taken at a different axial plane.

FIGURE 11 is a plan view of the driving member illustrated in FIGURE 10.

FIGURE 12 is an enlarged detail of the actuating member with actuating knob.

FIGURE 13 is an enlarged view of the entrainment member or clutching pawl of the clutch in accordance with the present invention.

FIGURE 14 is a front view of the casing illustrated in FIGURE 2, and

FIGURE 15 is a left side view of FIGURE 14.

Referring now more particularly to the drawing wherein like reference numerals are used throughout the various views to designate like parts, reference numerals 17 and and 17' designate the struts which carry the top or roof frame. The struts 17 and 17' are pivotally supported at the lower ends thereof in the rigid wall 20 of the vehicle body (FIGURE 1) in a manner to be described more fully hereinafter so that the top, when not in use, may be folded into a space 21 provided in the vehicle body as is well known in connection, for example, with convertibles. During raising or closing as well as during lowering or folding of the top the frame thereof is guided by means of guide arms 19 and 19' which are pivotally connected at the upper ends thereof with the top frame and with the lower ends thereof at the vehicle body 20.

The lower pivotal connection of guide arms 19 and 19' takes place by one drive arrangement 16 and 16' each made in accordance with the present invention which are secured to the vehicle wall 20 by means of bolts 18 and 18'. More particularly, each guide arm 19 and 19' is provided at the lower end thereof with a toothed or splined aperture or opening by means of which it is placed over a corresponding drive shaft 24 (FIGURES 2 and 4) which extends out of the respective drive arrangement 16 or 16' and which is provided with complementary external splines. The guide arms 19 and 19' are secured on the respective drive shafts 24 by means of a securing bolt 70 or the like engaging an internally threaded bore in drive shafts 24 (FIGURE 4). Consequently, during every rotational movement of drive shafts 24 by means of the driving sources 29 and 29' provided in each drive arrangement 16 and 16', the guide arms 19 and 19' are taken along for common rotation by the respective shafts 24. As a result thereof, depending on the direction of rotation of the shafts 24, the top is either raised or lowered.

The casing or housing of each drive arrangement 16 and 16', the drive shaft 24 of which is directed outwardly upon installation in the vehicle, consists of a part 22 (FIGURES 2, 3, 14 and 15) for the installation therein of a commercially available electric motor 29 (FIGURE 3) and of a part 23 to accommodate therein the reduction gear, the clutch arrangement and the control arrangement which will be more fully described hereinafter.

The housing part 23 is closed toward the vehicle interior by means of a cover 25 (FIGURES 2, 4, 14 and 15) through which extends an actuating knob 26 (FIGURES 2, 4, 8, 12 and 15).

The motor housing 22 which is provided at the rear side thereof with a cover or lid 28 (FIGURES 2, 3, 14 and 15) supporting the rear bearings for the rear portion of motor shaft 29'' is connected with the transmission housing 23 by means of bolts 28' (FIGURE 3). The front portion of motor shaft 29'' which extends into the housing 23 drives over two gear-reduction stages 30, 31 and 32, 33, formed, for example, by meshing spur gears, a worm shaft 36 provided with two thrust bearings 34 and 34' and with two radial bearings 35 and 35'. An internal hexagonal nut 27 completes the assembly of the worm shaft 36 within the housing 23. The drive is transmitted from the worm shaft 36 provided with the worm 36' to the worm wheel 37, and from the worm wheel 37 to the drive shaft 24 in a manner to be more fully described hereinafter in connection with the disengageable clutch mechanism.

A switching finger 49 provided with adjustable abutment members 53 and 53' is secured to the end of the drive shaft 24 directed toward the vehicle interior by means of a splined connection 50 and a split ring 51 (FIGURE 3). The driving motor 29 is automatically disengaged or disconnected in both end positions of the top by means of this switching finger 49 which thereby provides in effect a limit switch for both end positions of the top, as will be more fully explained hereinafter by reference to FIGURE 7.

A disengageable clutch which is separately illustrated in FIGURES 4 and 8 to 13, is operatively connected between the worm wheel 37 and the drive shaft 24. The clutch comprises an entrainment disk 24' formed integrally with the drive shaft 24 (FIGURES 10 and 11). The entrainment disk 24' is provided with diametrically opposite guide slots or apertures 55 and 55' for accommodating the essentially square entrainment members or coupling bolts 42 and 42' (FIGURES 4, 8 and 13). The entrainment members or coupling bolts 42 and 42' may be displaced radially outwardly in the slots 55 and 55' against the effect of springs 58 and 58' by a pin 73 as described hereinafter (FIGURES 8 and 9). In the outer position thereof as shown in FIGURES 4, 8 and 9, the entrainment members or coupling bolts 42 and 42' engage with the respective outer ends 64 thereof (FIGURE 13) into recesses or apertures 39 and 39' provided in the rim of the worm gear 37 and thereby establish a driving connection between the drive shaft 24 and the worm wheel 37 which insures a common rotation therebetween. The gear disk 38 (FIGURES 4, 8 and 10) is formed integral with the gear rim of worm wheel 37 and is centered below the entrainment disk 24' on the drive shaft 24 at 71 (FIGURE 10) by means of an appropriately shaped hub portion of drive shaft 24 which assures the coaxial relationship therebetween. The gear disk 38 and therewith the worm wheel 37 is retained in place by means of a disc 40 (FIGURES 4, 8 and 10) detachably secured on shaft 24 and with as little as possible play between the disc 40 and the entrainment disc 24'.

The entrainment members or coupling bolts 42 and 42' are provided at the inner ends thereof with cylindrical extensions 41 and 41', respectively (FIGURE 13), by means of which they extend through cross bores 61 and 61' (FIGURES 9, 10 and 11) provided in the drive shaft 24 into a longitudinal bore 60 thereof, when the entrainment or coupling bolts 42 and 42' have been moved toward the inner positions thereof under the effect of the springs 58 and 58' in which the worm wheel 37 is disengaged or uncoupled from the drive shaft 24.

An actuating pin 73 (FIGURE 12) which is provided with an outer actuating knob 26 and with a pointed end 72 at the inner end thereof, is arranged in an axially displaceable manner in the longitudinal bore 60 of the drive shaft 24. If the pin 73 is manually pressed into the bore 60, then it displaces the entrainment members or coupling bolts 42 and 42', which are slightly rounded off at their inner ends 43 and 43' (FIGURE 13), against the effect of the springs 58 and 58' radially outwardly into the apertures 39 and 39' of the rim of the worm wheel and thereby couple the worm wheel 37, 38 with the drive shaft 24. The entrainment members or coupling bolts 42 and 42' are prevented from leaving the slots 55 and 55' in an upward direction, as viewed in FIGURE 8, i.e. in an upward direction parallel to the axial direction of bore 60, by means of shackles 56 and 56' which are secured to the entrainment disc 24'. The springs 58 and 58' which may be made, for example, of spring steel wire, abut, on the one hand, against the pins 57, 57', 57'' and 57''' (FIGURES 4 and 9) inserted into the entrainment disc 24' and, on the other, against the pins 59 and 59' inserted into the entrainment members or coupling bolts 42 and 42'.

The transmission casing 23 is closed on the side thereof adjacent the actuating knob 26 by means of a cover 45 disengageably connected therewith at adjoining portion 46 by means of bolts 46' (FIGURE 4). The cover 45 carries the switching arrangement, generally designated by reference numeral 44, for the electric motor 29. The switching arrangement 44 cooperates with the switching finger 49 and consists essentially of two springy switching contacts 52 and 52' (FIGURE 6) which are rigidly secured in an annularly-shaped recess 47 (FIGURE 5) of the cover 45 on electrically insulating bases 48 and 48'. The contacts 52 and 52' cooperate with the switching finger 49 during the raising or lowering movement of the top by the drive mechanisms 16 and 16' in such a manner that the switching finger 49 during closing of the top in its end position abuts with the abutment member 53 thereof against the contact 52 and thereby opens the same as illustrated in FIGURE 6, whereby the electric motor 29 or 29' of the corresponding drive arrangement 16 or 16' is automatically disengaged. Vice versa, the same control effect is obtained when during opening of the top the abutment member 53' of the switching finger 49 abuts in the lower end position thereof against the contact 52' which will thereby be opened to disengage again the corresponding electric motor 29 or 29'.

FIGURE 7 illustrates an appropriate electric wiring diagram for the various electric parts of the drive arrangement in accordance with the present invention. Reference character H designates the main selectively-actuatable switch which is disposed, for example, at the dash or instrument board of the motor vehicle for manual operation by the driver of the vehicle. In the upper position thereof designated by "Open" the switch H connects one terminal of the battery B over lines 75, 76 and 78, with the switching contacts 52' of both vehicle drive mechanisms 16 and 16' and over the normally closed switching contacts 52' and lines 77 and 79 with the electric motors 29 and 29'. The selectively-energizable reversible electric motors 29 and 29' are of the pole reversing type, i.e., will operate for right hand or left hand rotation upon change of pole connection. In the position of the main switch H designated "Open," the motors 29 and 29' are connected over the normally closed contacts 52' with the source of electric energy B in such a manner that they rotate in a direction in which the top or roof opens, i.e., in which the roof is folded rearwardly and downwardly as viewed in FIGURE 1. The circuit is completed through the ground or mass of the vehicle to which the other terminal of the battery and of the electric motors are completed. As soon as the top is completely opened, the abutment members 53' (not shown in FIGURE 7) of the switching finger 49, which is secured to the drive shaft 24 and therefore moves in unison with the rotation of the drive shaft 24 corresponding to the movement of the top guide arm 19 and 19', abut against the switching contacts 52' and open the same whereby the supply of current to the electric motor 29 and 29' is interrupted and the drive arrangements 16 and 16' is stopped.

It it is desired to raise or close the top, then the main switch H is shifted to the "Close" position thereof in which it connects the source of power or batter B over lines 75, 80 and 81 with the switching contacts 52 and over these normally closed contacts and over the lines 82 and 83 and with the electric motors 29 and 29'. The motors 29 and 29' will then rotate in the opposite direction due to pole reversal so that the drive arrangements 16 and 16' pivot the guide arms 19 and 19' and therewith the top or roof frame out of the space 21 upwardly and forwardly into the position illustrated in FIGURE 1 in which the shifting finger 49, which is positively driven by the drive shaft 24 together with the guide arms 19 and 19' breaks the contact 52 by means of the abutment members 53 and thereby interrupts or stops the drive. FIGURE 7 illustrates the condition of the electric circuits at that time. It is understood, however, that the raising and lowering movement of the top may also be interrupted or stopped in any intermediate position in that the switch H is returned into the center position "C" as illustrated in FIGURE 7.

In order to enable actuation or movement of the top also in case of breakdowns or troubles in the electrical drive of the arrangement, it is only necessary to manually pull out the pins 73 of both arrangements 16 and 16' a slight distance out of drive shafts 24 by means of the actuating knobs 26 so that the pointed ends 72 of the pins 73 render free the path for the radially inward movement of the entrainment members or coupling bolts 42 and 42'. The entrainment members or coupling bolts 42 and 42' are then displaced radially inwardly into the bore 60 of the drive shaft 24 by the springs 58 and 58' so that with the outer ends thereof the entrainment bolts 42 and 42' emerge from or leave the apertures 39 and 39' of the worm wheels 37 and thereby disengage or uncouple the latter from the drive shafts 24. The guide arms 19 and 19' which are rigidly connected with the drive shafts 24 and therewith the entire top may then be freely moved manually to and fro independently of the drive arrangement 16 and 16'. However, prior to uncoupling of the drive arrangement in any intermediate position of the top, it is necessary every time to lift at first the top or roof frame slightly manually since as long as the weight of the top rests on the drive shafts 24 tending to rotate the latter and therewith also on the clutching parts, an automatic displacement of the entrainment bolts 42 and 42' in a radially inward direction by the relatively weak springs 58 and 58' is not possible by reason of the relatively strong friction of the entrainment bolts 42 and 42' in the guide apertures 55 and 55' and in the apertures 39 and 39' of the worm gear 37.

This arrangement constitutes a safety measure that prevents that the top may fall down accidentally under the force of its own weight from any intermediate position and may thereby possibly hurt some passengers if anyone inadvertently pulls out the actuating knobs 26 of the clutch.

If the clutch is engaged, an automatic falling down or lowering of the top is also not possible even if the drive arrangements 16 and 16' are inoperative as the transmission of driving power between electric motors 29 and 29' and the corresponding worm wheels 37 acts in a self-locking manner owing to the relatively large reduction gear ratio in the opposite direction.

The present invention is particularly useful in the application to tops of convertible motor vehicles. However, it is understood that it is equally advantageous for application in connection with other constructions which are carried by pivotal struts, such as marquees, awnings and the like in buildings.

While I have shown and described one specific embodiment in accordance with the present invention, it is understood that the same is not limited thereto and is susceptible of many changes and modifications within the spirit of the present invention and I intend to cover all such changes and modifications except as defined in the appended claims.

I claim:

1. A drive arrangement for foldable top constructions of motor vehicles provided with a vehicle body wall structure and pivotal strut means pivotally supporting the entire top on said vehicle body wall, comprising drive means selectively operable to open and close the top and including a pair of unitary assemblies each having a selectively-energizable motor and a drive shaft, each of said drive shafts being connected to a respective strut means for actuating the latter to change the position of said foldable top and simultaneously forming a pivot pin for pivotally supporting the respective strut means of said top, and means for rigidly securing said unitary assemblies to said vehicle body wall, said unitary assemblies each including means providing a pivot bearing means for its respective drive shaft for pivotally supporting said top on said unitary assemblies.

2. A drive arrangement for foldable top constructions according to claim 1 wherein each unitary assembly of said drive means includes a driving motor and reduction gear means connected with said driving motor, and disengageable means connecting said drive shaft and said reduction gear means for driving said drive shaft by said driving motor over said reduction gear means.

3. A drive arrangement for foldable top constructions according to claim 2 wherein each said reduction gear means includes a worm gear drive and said disengageable means is located between said worm gear drive and said drive shaft.

4. A drive arrangement for foldable top constructions according to claim 3 including means responsive to the weight of said top to prevent disengagement of said disengageable means as long as the drive shaft is urged to rotate by the weight of said top in a direction corresponding to top opening.

5. A drive arrangement for foldable top constructions provided with pivotal strut means essentially forming the sole pivotal means for supporting the entire top on a relatively fixed part, comprising drive means selectively operable to open and close the top and including a unitary assembly having a selectively-energizable motor, a drive shaft, disengageable means between said motor and said shaft and means conditioned by the weight of the top for preventing disengagement of said disengageable means as long as the weight of said top tends to rotate said drive shaft in a direction corresponding to top opening, said drive shaft being connected to said strut means for actuating said top and simultaneously forming a pivot pin for pivotally supporting said top, and means for rigidly securing said unitary assembly to said relatively fixed part for supporting the top thereon, said unitary assembly including means providing a pivot bearing for said drive shaft to support the top directly by said unitary assembly.

6. A drive arrangement for foldable top constructions comprising a foldable roof with a main strut on each side thereof, said main struts essentially supporting and absorbing the weight of said foldable roof on a relatively fixed part, means for pivotally supporting said main struts independently of each other including a drive shaft rigidly connected therewith, and a housing essentially enclosing each of said pivotal means, said housings being arranged at a distance from each other which corresponds to the width of said roof and being rigidly connected with said relatively fixed part, reversible motor drive means in each of said housings, self-locking gear means providing a speed reduction between each motor drive means and each drive shaft, a manually actuatable form-locking mechanical clutch means arranged between each said gear means and each said drive shaft, clutch means including an entrainment disk securely fastened to said drive shaft for common rotation therewith, said entrainment disk being provided with radial guide slots and said gear means being provided with apertures, coupling bolts accommodated in said guide slots and extending with the outer ends thereof into said apertures to effect a driving engagement between said gear means and said drive shaft, said drive shaft being provided with a longitudinal bore, said coupling bolts extending with the inner ends thereof into said longitudinal bore, relatively weak spring means for normally urging said coupling bolts radially inwardly to disengage the outer ends thereof from said apertures, pin means provided with an inner pointed end in said longitudinal bore adapted to urge said coupling bolts radially outwardly with the pointed end thereof upon insertion into said longitudinal bore, and disengageable means operative by the weight of the top to prevent disengagement of said coupling bolts from said apertures as long as the weight of said top tends to rotate said drive shaft in a direction corresponding to top opening.

7. A drive arrangement for foldable top constructions comprising a foldable roof with a main strut on each side thereof, said main struts essentially supporting and absorbing the weight of said foldable roof on a relatively fixed part, means for pivotally supporting said main struts independently of each other including a drive shaft rigidly connected therewith, and a housing essentially enclosing each of said pivotal means, said housings being arranged at a distance from each other which corresponds to the width of said roof and being rigidly connected with said relatively fixed part, reversible motor drive means in each of said housings, self-locking gear means providing a speed reduction between each motor drive means and each drive shaft, a manually actuatable form-locking mechanical clutch means arranged between each said gear means and each said drive shaft, and means conditioned by the weight of the top for preventing disengagement of said clutch means as long as the weight of said foldable top tends to rotate said drive shaft in a direction corresponding to top openings.

References Cited in the file of this patent

UNITED STATES PATENTS

| 1,230,110 | Byron | June 19, 1917 |
| 1,287,155 | Wheeler | Dec. 10, 1918 |
| 1,416,659 | Watt et al. | May 16, 1922 |
| 1,941,161 | Wise | Dec. 26, 1933 |
| 2,105,293 | Paulin | Jan. 11, 1938 |
| 2,170,315 | Wonderly | Aug. 22, 1939 |
| 2,456,444 | Reid et al. | Dec. 14, 1948 |
| 2,580,486 | Vigmostad | Jan. 1, 1952 |
| 2,692,162 | Rossmann | Oct. 19, 1954 |
| 2,759,761 | Dandini | Aug. 21, 1956 |
| 2,768,857 | Albrecht | Oct. 30, 1956 |
| 2,770,489 | Garvey et al. | Nov. 13, 1956 |
| 2,828,845 | Thornton | Apr. 1, 1958 |

FOREIGN PATENTS

| 528,645 | Germany | July 2, 1931 |
| 582,035 | Germany | Aug. 7, 1933 |
| 353,924 | Italy | Nov. 3, 1937 |